F. PETER.
CHURN.
APPLICATION FILED JUNE 11, 1909.

943,200. Patented Dec. 14, 1909.

WITNESSES:
Harry A. Beimes
Fannie E. Weber

INVENTOR.
Fred Peter.
BY
ATTORNEY.

UNITED STATES PATENT OFFICE.

FRED PETER, OF ANNA, ILLINOIS.

CHURN.

943,200.  Specification of Letters Patent.  Patented Dec. 14, 1909.

Application filed June 11, 1909.  Serial No. 501,537.

*To all whom it may concern:*

Be it known that I, FRED PETER, citizen of the United States, residing at Anna, in the county of Union and State of Illinois, have invented certain new and useful Improvements in Churns, of which the following is a full, clear, and exact description, reference being had to the accompanying drawings, forming a part hereof.

My invention has relation to improvements in churns; and it consists in the novel construction of churn more fully set forth in the specification and pointed out in the claim.

Figure 1:
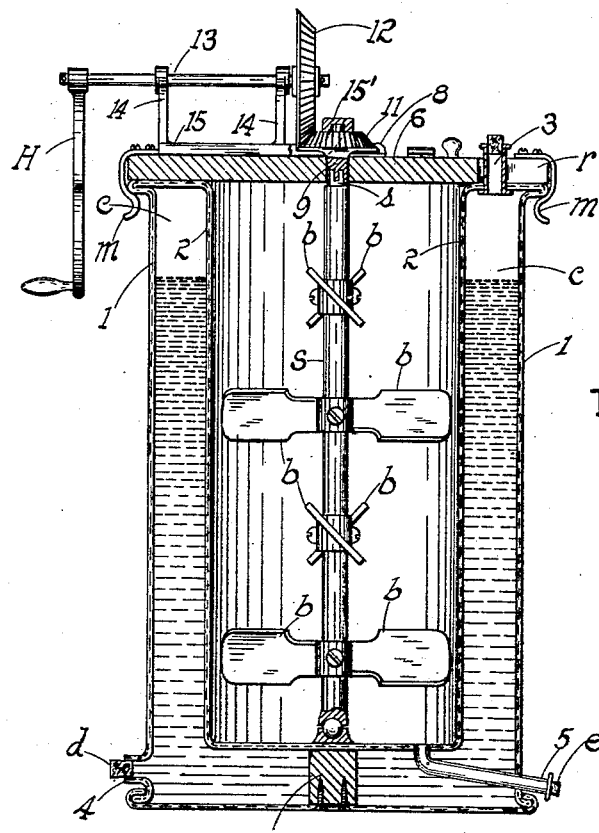
Figures 2, 3:
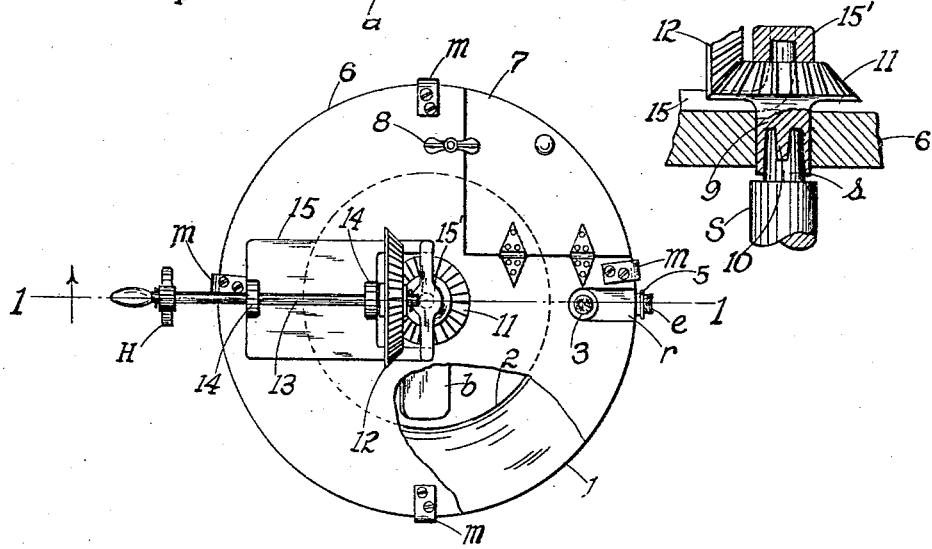

In the drawings, Figure 1 is a vertical middle section on the line 1—1 of Fig. 2; Fig. 2 is a top plan; and Fig. 3 is an enlarged sectional detail showing the connection between the driving gears and the shaft of the dasher.

The object of my invention is to provide a churn the cream of which may be agitated at any desired temperature, the churn being provided with a compartment into which hot or cold water may be introduced without coming in contact with the cream. The device may likewise be used as a cooler or separator by the introduction of cold water into said compartment.

A further object is to provide a churn whose dasher shaft may be readily disconnected from the driving mechanism which is preferably located on a detachable cover adapted to be readily removed in the event access to the interior of the churn is desired.

In detail the invention may be described as follows:—

Referring to the drawings, 1 represents an outer vessel and 2 an inner vessel, the walls of the vessels being spaced a suitable distance apart and forming a compartment $c$ into which water may be introduced to keep the contents of the vessel 2 at any desired temperature. The bottom of the vessel 2 is spaced from the bottom of the outer vessel by a block $a$. The water may be introduced into the compartment $c$ through a filling tube 3, and discharged therefrom through the outlet nozzle 4, normally closed by a plug $d$. The buttermilk is discharged from the inner vessel 2 through a tube 5 ordinarily closed by a plug $e$. Mounted over the churn is a cover plate 6 provided at a convenient point with a recess $r$ for the free passage of the tube 3 therethrough which arrangement prevents rotary displacement of the cover when once in place, the cover being further locked to the walls of the churn by spring arms $m$ secured to the cover and frictionally engaging the upper flanged end of the churn. To gain access into the cream compartment I provide the cover with a hinged lid 7 which is normally held down by a rotatable locking nut 8 as shown (Fig. 2).

Passing centrally through the inner vessel and resting preferably on a ball bearing is the dasher shaft S provided with a series of blades $b$, the upper end of the shaft terminating in a reduced stem $s$ which freely enters the socket 9 of the bevel pinion 11 mounted in the cover 6, said socket being provided with a tongue 10 received by a recess formed in the stem $s$.

The pinion 11 meshes with a vertically rotating bevel gear 12 at the inner end of a horizontal shaft 13 mounted in bracket arms or posts 14 cast with the base plate 15, the latter having a bearing 15' formed therewith for the support of the upper spindle of the pinion 11 (Fig. 3). The outer end of the shaft 13 is provided with a crank handle H.

The driving mechanism being thus all carried by the cover 6, it is obvious that when said cover is removed, the tongue 10 of the pinion 11 slips out of the recess formed on the stem $s$ of the shaft S, whereupon the shaft and its blades may be removed and cleaned. The water in the compartment $c$ may be of any desired temperature, and kept so by fresh additions during the churning operation.

Having described my invention, what I claim is:—

A churn comprising an outer vessel and an inner vessel spaced apart therefrom at the sides and bottom and forming a compartment between them, a buttermilk discharge tube leading from the bottom of the inner vessel through said compartment and tapping the side wall of the outer vessel, said tube being normally closed by a plug, a filling tube leading from the top of said compartment, a cover for the churn provided with a recess for the reception of the tube, a dasher shaft supported in the inner vessel, and suitable gearing for actuating said shaft, mounted on the cover and detachably engaging the upper end of the shaft.

In testimony whereof I affix my signature, in presence of two witnesses.

FRED PETER.

Witnesses:
WM. BRUHHAUSER,
FRANK H. HALL.